(12) United States Patent
Kocherovsky et al.

(10) Patent No.: US 7,390,150 B2
(45) Date of Patent: Jun. 24, 2008

(54) CUTTING TOOL WITH ADJUSTABLE INDEXABLE CUTTING INSERT

(75) Inventors: Yevgeny Kocherovsky, West Bloomfield, MI (US); Brian D. Hoefler, Macomb, MI (US); Kenneth G. Noggle, West Bloomfield, MI (US)

(73) Assignee: Valenite LLC, Madison Heights, MI (US)

( * ) Notice: Subject to any disclaimer, the term of this patent is extended or adjusted under 35 U.S.C. 154(b) by 0 days.

(21) Appl. No.: 11/416,176

(22) Filed: May 3, 2006

(65) Prior Publication Data

US 2007/0256287 A1 Nov. 8, 2007

(51) Int. Cl.
*B23B 27/16* (2006.01)
*B26D 1/00* (2006.01)
(52) U.S. Cl. ............................................. 407/40; 40/67
(58) Field of Classification Search .................. 407/40, 407/46, 67, 95, 96, 108; 408/108
See application file for complete search history.

(56) References Cited

U.S. PATENT DOCUMENTS

| | | | |
|---|---|---|---|
| 4,462,725 A * | 7/1984 | Satran et al. ................... 407/92 |
| 5,271,440 A * | 12/1993 | Bradstreet et al. ........... 144/176 |
| 5,810,518 A | 9/1998 | Wiman et al. |
| 5,924,826 A | 7/1999 | Byström et al. |
| 6,249,950 B1 * | 6/2001 | Brask et al. .................... 29/434 |
| 6,684,752 B2 * | 2/2004 | Satran et al. ................... 83/835 |
| 6,921,234 B2 | 7/2005 | Arvidsson et al. |

* cited by examiner

*Primary Examiner*—Willmon Fridie
(74) *Attorney, Agent, or Firm*—Drinker Biddle & Reath LLP (57) ABSTRACT

A cutting tool is provided and includes a plurality of cutting inserts located in respective insert pockets. The cutting inserts each include a top cutting plane with at least one cutting edge and a bottom support plane. The top cutting plane includes an engagement portion for mating with a respective engagement portion located in the respective insert pocket. A clamping wedge clamps the cutting insert against the respective insert pocket. A shear resistance created between the engagement portions of the cutting insert and the respective insert pocket during operation of the tool is greater than a centrifugal force created during operation of the cutting tool. In an exemplary embodiment, the engagement portions are shown as a plurality of serrations. The cutting tool is particularly useful in high speed milling operations.

18 Claims, 13 Drawing Sheets

CUTTING TOOL WITH ADJUSTABLE INDEXABLE CUTTING INSERT

FIELD OF THE INVENTION

The present invention generally relates to cutting tools. More particularly, the present invention pertains to high speed milling cutters.

BACKGROUND DISCUSSION

Cutting tools used for machining work pieces of metal, such as steel, aluminum, titanium, etc., typically include a tool holder for mounting removable cutting inserts. During operation of the cutting tool, a centrifugal force $F_z$ is generated. In high speed milling operations, centrifugal force $F_z$ becomes significant due to its relationship with spindle speed (growing in power 2 proportional to spindle speed) in accordance with the equation $F_z=M*W^2*R$, where M is the mass of the insert, W is the speed of rotation, and R is distance between the rotational center of the tool and the position of the insert's center of mass. The cutting tool system becomes unbalanced when the centrifugal force $F_z$ exceeds a clamping force.

Figure 20:
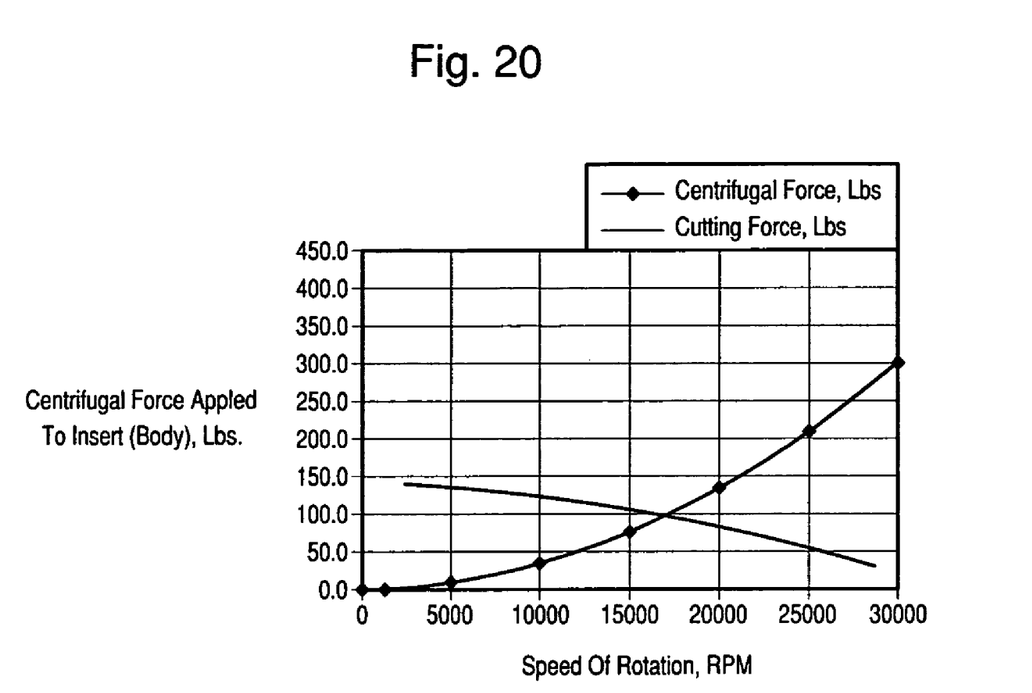
FIG. 20 is a graph representing speed of rotation versus centrifugal force.

With reference to FIG. 20, the relationship of cutting speed on cutting force is shown. As illustrated in FIG. 20, an increase in cutting speed typically supports a reduction of the cutting force. In particular, the hardness and strength of the workpiece material is decreased due to increased temperature in the cutting zone at high speeds. At the same time, centrifugal force applied to the insert Fz is growing dramatically (square to RPM). There is a point where the centrifugal force becomes larger than the amplitude of the cutting force. For high speed machining, the centrifugal force will be typically larger than cutting force. High speed machining typically has RPMs in excess of 10,000. However, most traditional designs of inserts and clamping mechanisms are designed for low centrifugal force and may fail during high speed machining.

At high cutting speeds, centrifugal forces applied to the cutting element significantly exceed cutting forces. If the clamping system fails, kinetic energy accumulated during rotation will be released in accordance with $E_K=(\frac{1}{2})MV^2$ wherein M is the mass of the object and V is the linear velocity at the moment of failure. Because of the above-noted relationship, one of most important factors and requirement at high speeds is safety of the rotating tool.

Cutting tools have been designed with an open pocket for location of a cutting insert. A disadvantage with this particular design is that high centrifugal force is applied to the clamping screw, which is already pre-stressed during clamping. When the screw fails, the insert is "free to fly" to release significant kinetic energy.

There are known designs of milling cutters which utilize inserts with serrations on a bottom surface or surface opposed to the cutting plane of the insert, as shown, for example, in U.S. Pat. Nos. 5,924,826, 5,810,518, and 6,921,234. A disadvantage of these systems is vulnerability of the cutter body for collisions and breakage of the inserts. Because serrations are provided on the insert bottom to support insert load, and being extended to the maximum, damage occurred is usually very severe and repair is very difficult. Another disadvantage of these designs is the absence of axial adjustment mechanism, which would allow precision positioning of the inserts without costly grinding in assembly.

Finally, as discussed above, a single screw is used for securing the insert in the open pocket. If the screw fails, the entire insert will be released from the pocket. There is no additional features or redundancy that further prevents the insert from being released during operation should the screw fail. Therefore, there is a need in the art for a cutting tool where the clamping screw is not subjected to the cutting load, and does not take significant centrifugal load. In addition, there is a need in the art for redundant securing features in high speed applications.

While the serrations provided on the bottom surface can absorb a significant portion of centrifugal force, they can not absorb 100% of the centrifugal force. Due to the angular nature of the serration's cross section, there still is a portion of centrifugal force, which has "lifting" power. When cutter rotation speed is increasing, a portion of centrifugal force reflected through serrations to the clamping screw is growing also. At some point, the centrifugal force will cause the insert to lift and make the cutting tool fail. Another disadvantage of this type of cutting tool is that if the insert uses two cutting edges, the second edge will experience premature wear by hitting chips generated during the cut. Also, ongoing chips contact elements of any adjustment mechanism, which further creates premature wear.

For cutting tools having a carbide tip, the ability to stay retained in the insert becomes even more crucial. Because carbide is twice as dense as steel, it will be subjected to a larger centrifugal load. Due to its weight, it is more likely to fly out of the pocket. In addition, the carbide tip takes a majority of the cutting load, and could become separated from the body. For applications using carbide tips, it is important that should a failure occur, that only a small portion of the carbide tip be released, causing a smaller likelihood of damage.

Accordingly, there is a need in the art for an improved milling cutter for high speed milling operations. In addition, there is a need in the art for an insert that is more resistant to wear and failure. Finally there is a need in the art for redundant securing features in high speed applications, particularly those using heavier materials such as carbide.

SUMMARY

According to a first aspect, a cutting tool includes a tool body including at least one insert pocket. The at least one cutting insert is retained in the at least one insert pocket. The at least one cutting insert includes a top cutting plane with at least one cutting edge and a bottom support plane. The top cutting plane includes an engagement portion for mating with a respective engagement portion located in the at least one insert pocket. A clamping wedge clamps the at least one cutting insert against the at least one insert pocket. A shear resistance created between the engagement portions of the at least one cutting insert and the at least one insert pocket during operation of the tool is greater than a centrifugal force created during operation of the cutting tool.

According to a second aspect, a cutting insert includes a top cutting plane with at least one cutting edge and a bottom support plane. The top cutting plane includes an engagement portion for mating with a respective engagement portion of a cutting tool, wherein the engagement portion provides a cross sectional shear area with a strength greater than a centrifugal force created during operation of the cutting tool.

According to a third aspect, a method for assembling a cutting tool includes providing a cutting tool including a tool body having at least one insert pocket. At least one cutting insert is inserted within at least one insert pocket. A clamping wedge is driven within the at least one insert pocket and locked against the at least one cutting insert so that approximately 75% of the at least one insert is contained within the at least one insert pocket. The clamping wedge is adjusted to thereby secure or remove the at least one cutting insert.

BRIEF DESCRIPTION OF THE FIGURES

The accompanying drawings provide visual representations which will be used to more fully describe the representative embodiments disclosed herein and can be used by those skilled in the art to better understand them and their inherent advantages. In these drawings, like reference numerals identify corresponding elements.

DETAILED DESCRIPTION

Figure 1:
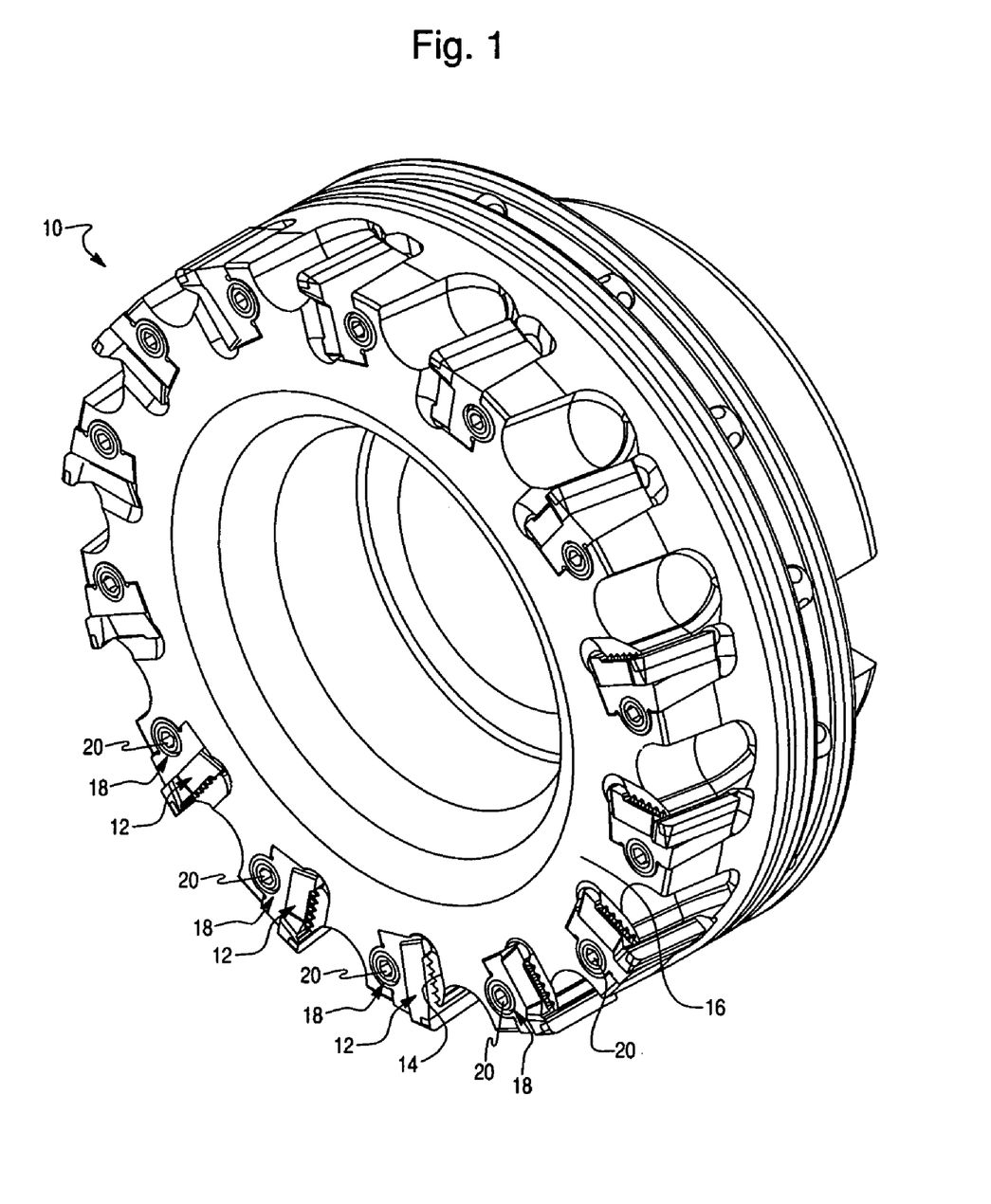
FIG. 1 is a perspective view of an exemplary embodiment of the cutting tool of the present invention.

FIG. 1 shows an exemplary embodiment of cutting tool 10 of the present invention. While the cutting tool 10 is generally described as suitable for use as a milling cutter, it should be understood that the cutting tool 10 according to the present invention is applicable to other cutting operations, such as turning. Moreover, the cutting tool 10 is designed to be used in high speed milling applications. From the standpoint of materials, high speed milling preferably ranges from between about 5,000-12,000 m/min or 15,000-36,000 SFM (surface speed per minute). From the standpoint of spindle rotation, high speed milling would be 10,000-40,000 rpm, and up to 60,000 rpm in the future. However, it should be understood that the cutting tool 10 in accordance with the present invention may also be used in low speed applications. For applications with a cutter velocity of about 20,000 sfm, Table 1 provide below demonstrates the relationship between cutter diameter and spindle rotation, where SFM=$(\pi*D*RPM)/12$.

TABLE 1

| Diameter (Inches) | Spindle Rotation, RPM |
| --- | --- |
| 2.5 | 30,558 |
| 3 | 25,465 |
| 3.5 | 21,827 |
| 4 | 19,099 |
| 12 | 6,366 |

Figure 2:
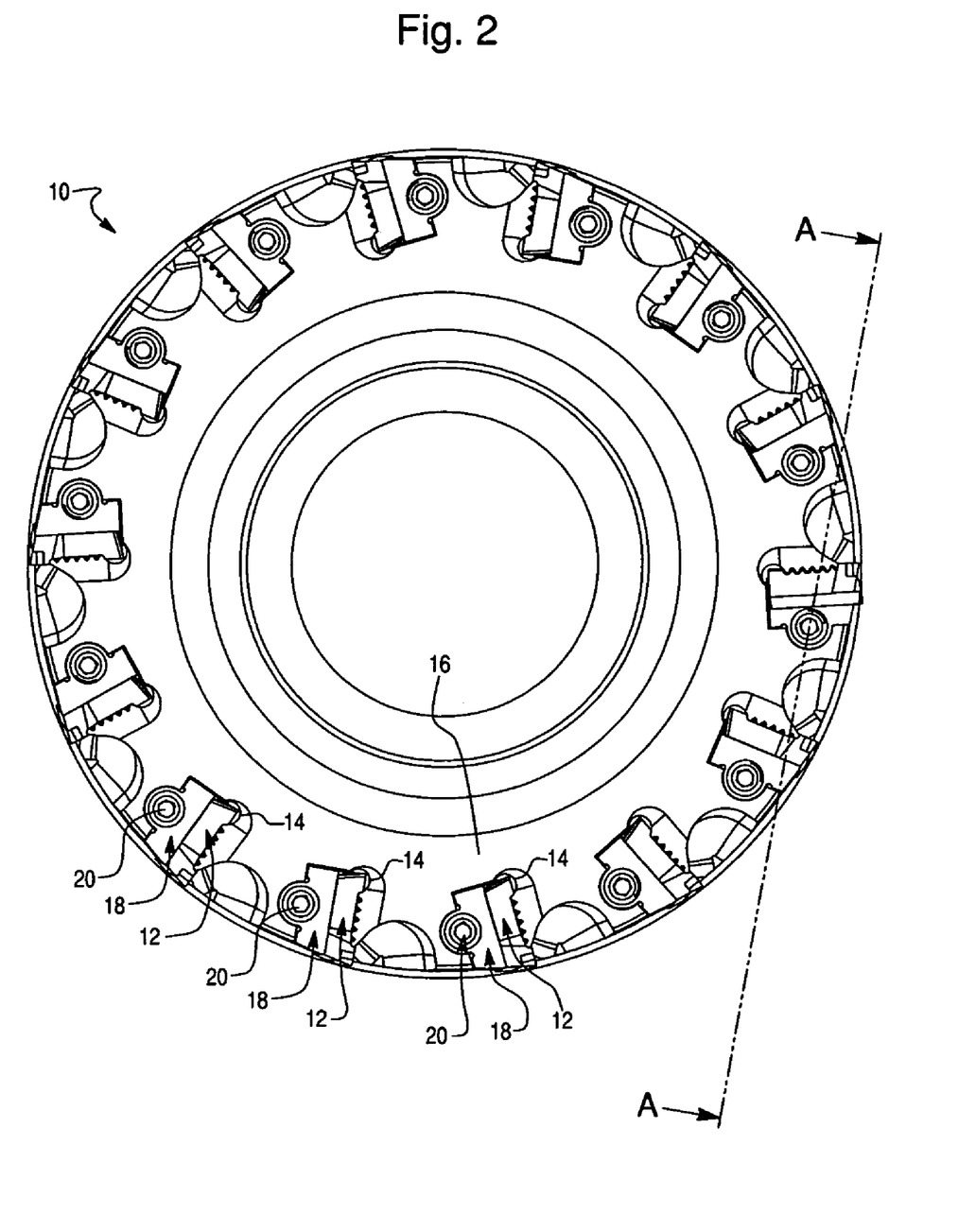
FIG. 2 is a plan view of an exemplary embodiment of the cutting tool of the present invention.

With reference to FIGS. 1-2, the cutting tool 10 illustrated therein is in the form of a milling head, which is part of a tool for chip removing machining. On the milling head, a plurality of cutting inserts 12 are assembled. Each cutting insert 12 is received within a corresponding pocket 14 of the tool holder body 16. In the exemplary embodiment, fourteen cutting inserts 12 are shown. However, it should be understood that there can be more or less cutting inserts 12, depending on design preference and application.

The cutting insert 12 is made of a suitable hard material, and which is preferably harder than the material of the tool holder body 16. The cutting insert 12 may, within the scope of the invention, be made of many different, hard materials, such as conventional cemented carbide, ceramics, cermets, or the like, and may include a cutting tip, in the form of small bodies of cubical boron nitride or polycrystalline diamond exposed in the cutting edge(s). Preferably, high strength steel is used as material for the tool holder body 16, which is strong and resistant to chip erosion.

Figure 3:
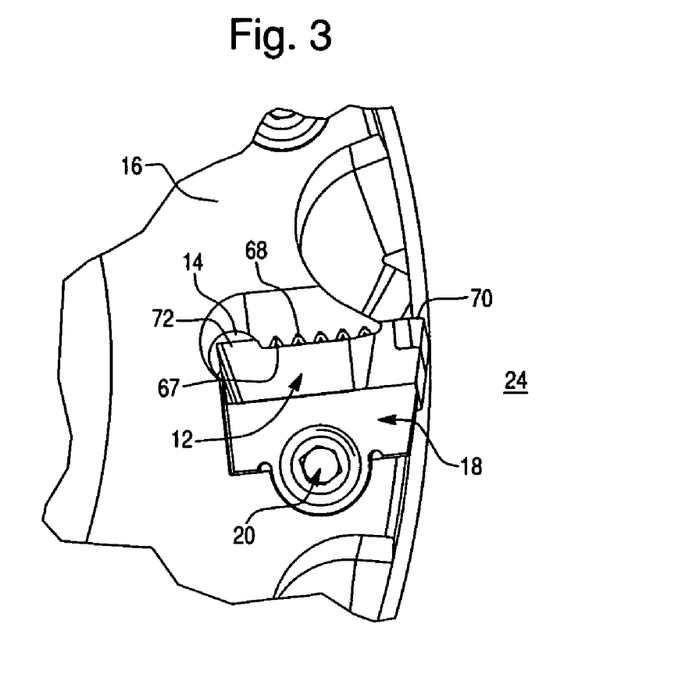
FIG. 3 is a partial, plan view of an exemplary embodiment of the cutting insert and clamping wedge of the cutting tool of the present invention.

With reference to FIGS. 1-3, a clamping wedge 18 is used to retain the cutting insert 12 within the insert pocket 14. Preferably, a clamping screw 20 is used for driving the clamping wedge 18 within the pocket to thereby lock the clamping wedge 18 against the cutting insert 12 on one side and body 16 on the other. Preferably, the clamping screw 20 is a differential screw, which functions to clamp and release the cutting insert 12 upon 1½ rotations of the clamping screw 20. Most preferably, the clamping screw is released by way of an L-wrench, but may be removed by other devices known in the art. However, it should be understood that the clamping wedge 18 may be secured in other ways known in the art, and is not limited to that of a differential screw. In addition, it should understood that the clamping screw 20 can be designed so that it will release the cutting insert 12 with more or less than 1½ rotations.

Because the cutting inserts 12 are subject to significant wear and frequently require replacement, the clamping wedge 18 provides for a quick insert change by simple release of the clamping wedge 18. Moreover, the clamping wedge 18 provides protection for the tool holder body 16 in case of collision with machining part or fixture, which can easily be replaced. Preferably, the clamping wedge 18 is made from high strength material, but may be made from other strong materials.

Figure 4:
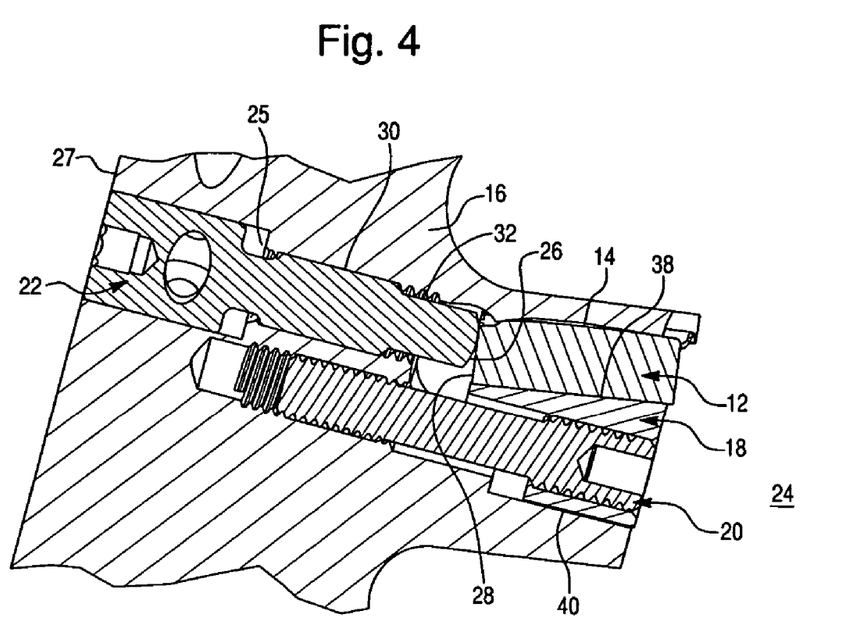
FIG. 4 is a cross sectional view of an exemplary embodiment of the cutting tool of the present invention illustrated in FIG. 2 taken along section line A-A.
Figure 5:
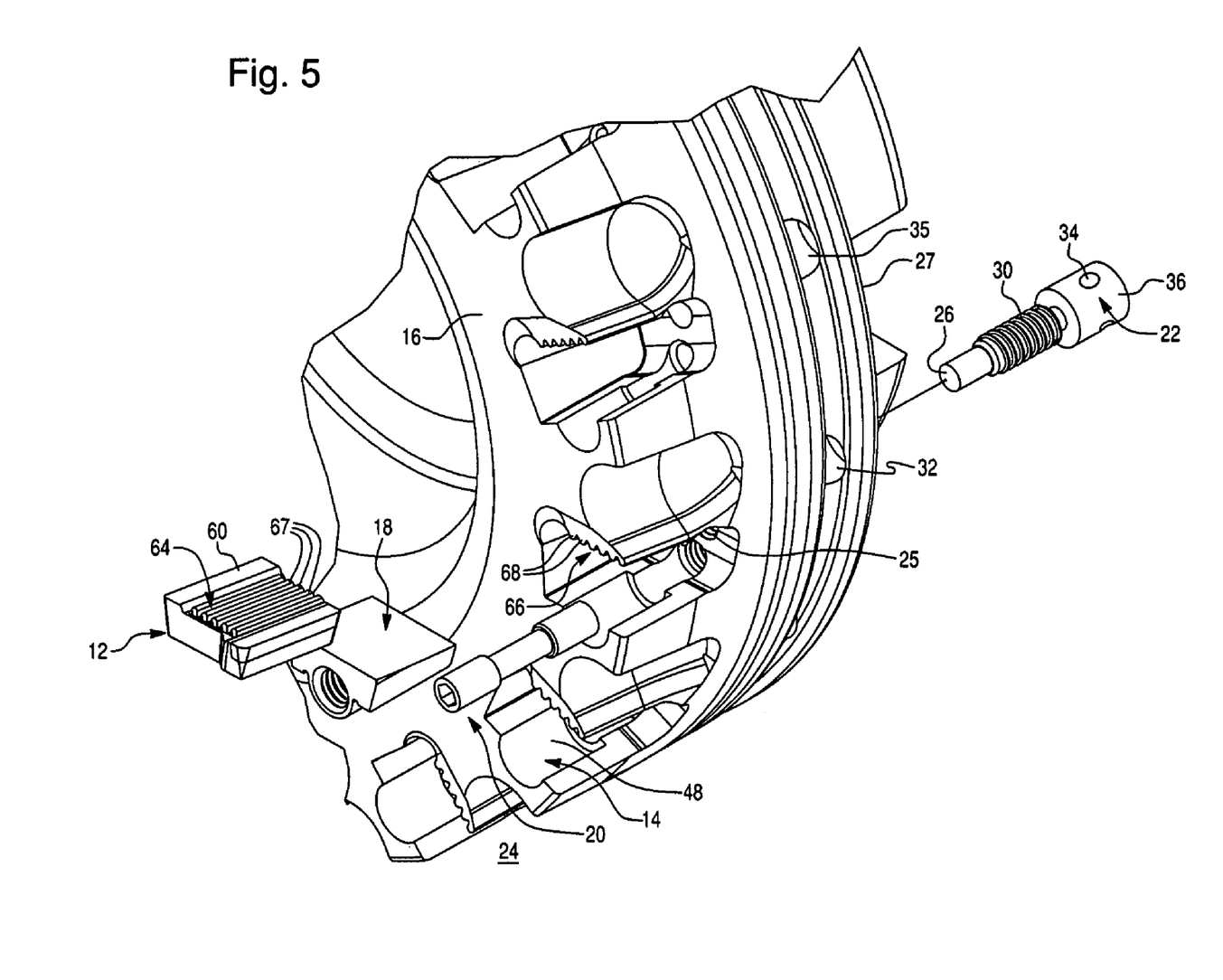
FIG. 5 is a partial, exploded perspective view of an exemplary embodiment of the cutting tool of the present invention.

With reference to FIGS. 4 and 5, the cutting insert 12 can be adjusted by way of an adjustment screw 22. The adjustment screw 22 is preferably located remote from the cutting zone 24. As shown in FIGS. 4 and 5, the adjustment screw 22 is positioned through a recess 25 located on a rear surface 27 of the cutting tool, and which extends into the pocket 14 to thereby contact the cutting insert 12. Because of the location of the adjustment screw 22, it is not exposed to wear from chips removed or to damage in case of collision. In addition, the adjustment screw 22 is vibration resistant, with a high accuracy of adjustment. Moreover, should the adjustment screw 22 become damaged during service, the adjustment screw 22 is easy to replace.

In the exemplary embodiment, the adjustment screw 22 includes a ball surface 26 at its end which is in contact with a thrust surface 28 of the cutting insert 12. The adjustment screw 22 also includes a threaded male portion 30 which engages a threaded female portion 32 formed in the tool holder body 16, as shown in FIG. 4. Preferably, the threaded male portion 30 and ball surface 26 of the adjustment screw 22 include elastic contact deformations. The adjustment screw 22 is advantageously located so that no toppling moment occurs during adjustment, so that the balancing state is not changed.

As discussed above, the adjustment screw 22 allows for axial adjustment of the cutting insert 12. Preferably, the adjustment screw 22 includes a plurality of recesses 34 along the periphery of the head 36 of the adjustment screw 22, as shown in FIG. 5. When the adjustment screw 22 is secured within the recess 25 so that it contacts the cutting insert 12, the cutting insert 12 can be adjusted in the axial direction by turning the adjustment screw 22. In particular, the recesses 34 are provided to allow the adjustment screw 22 to be adjusted, preferably, by way of an L-wrench. The L-wrench can access and engage the recesses 34 from side recesses 35 disposed on the cutting tool, as shown in FIG. 5. In this way, one single device can be used to adjust the adjustment screw 22 and to also drive and lock the clamping wedge 18, as described above. This offers a unified solution for maintenance wrenches. Moreover, torque wrenches are not needed. However, it should be understood that other devices may be used to adjust the adjustment screw 22.

With reference to FIGS. 4-7, the clamping wedge 18 will be described in more detail below. In particular, the clamping wedge 18 includes a top engagement surface 38 for engaging a bottom surface of the cutting insert 12, as shown in FIG. 4. Preferably, the top engagement surface 38 is flat, so that it abuts against the substantially flat bottom surface of the cutting insert 12. However, it should be understood that the top engagement surface 38 may have other contours, even similar to the top contour of the cutting insert 12, so long that it can be engaged and locked against the cutting insert 12. It should be noted that the tightening torque from the clamping wedge adds very little advantage to resistance to centrifugal load. Therefore, the clamping wedge need not be relied upon for retention.

Figure 6:
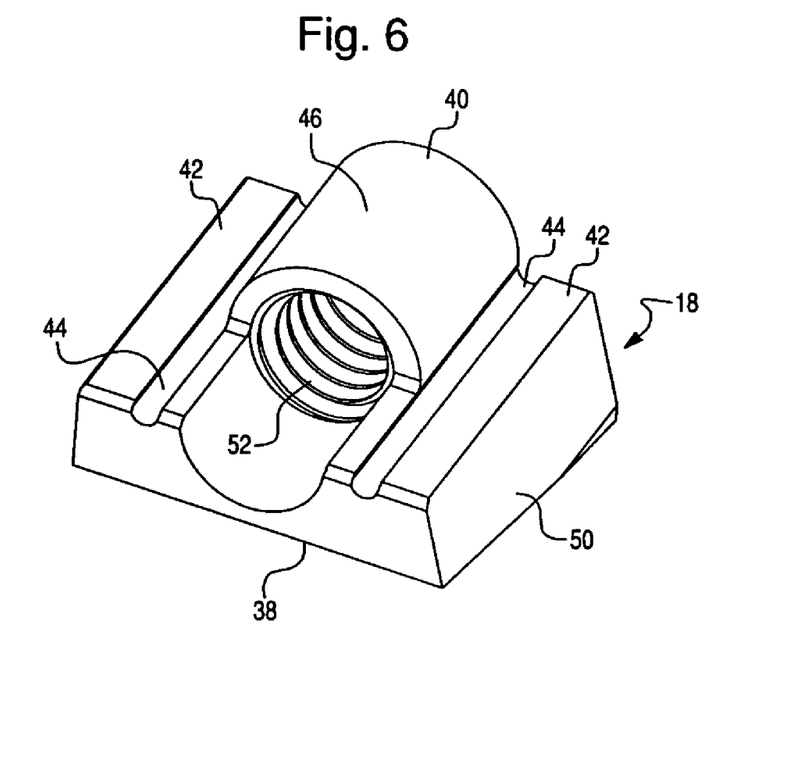
FIG. 6 is a bottom perspective view of an exemplary embodiment of the clamping wedge of the cutting tool of the present invention.
Figure 7:
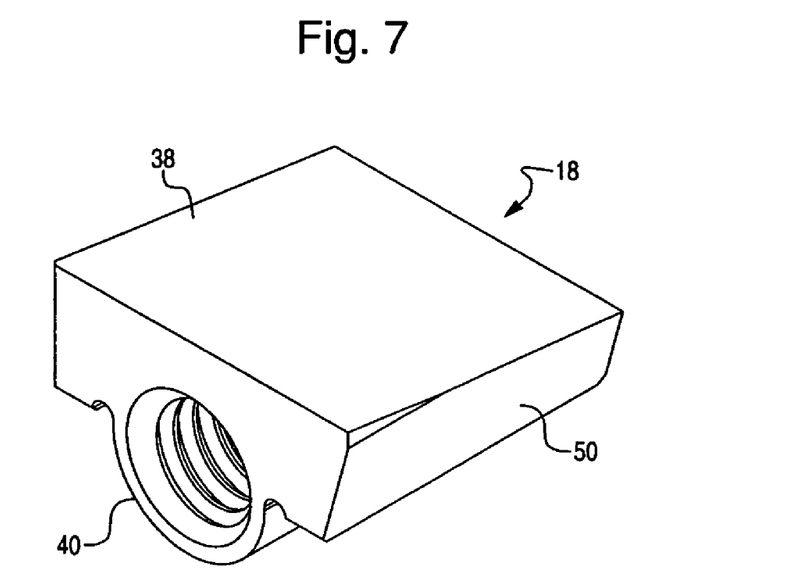
FIG. 7 is a top perspective view of an exemplary embodiment of the clamping wedge of the cutting tool of the present invention.

The clamping wedge 18 also includes a bottom surface 40. In the exemplary embodiment, the bottom surface 40 includes two planar portions 42 and two elongated grooved portions 44 spaced therefrom, as shown in FIG. 6. A rounded cylindrical portion 46 is disposed between the two elongated grooved portions 44. The bottom surface 40 is matingly received in the mounting surface 48 (see FIG. 5) disposed in a pocket 14 of the tool holder body 16. In this way, the mounting surface 48 is configured and shaped so that it engages and supports the bottom surface 40. As such, the mounting surface 48 should be correspondingly configured to receive and support the bottom surface 40 of the clamping wedge 18, as shown in FIG. 5. It should be understood that the bottom surface 40 may take other shapes, and is not limited to the particular configuration described herein.

The clamping wedge 18 includes two side surfaces 50, and a threaded female portion 52 for receiving the clamping screw 20, as shown in FIG. 6. Preferably, the planar surfaces 42 are tapered, so that the clamping screw 20 acts to engage and lock the cutting insert upon rotation of the clamping screw 20. In particular, as the clamping screw 20 is turned, the clamping wedge 18 moves towards inside the pocket 14 and the top engagement surface 38 presses against the bottom surface of the cutting insert 12, thereby locking and clamping it. It should be noted that the clamping wedge is locked in the same axis as the rotational axis of the tool. Therefore, stresses caused by the tightening torque do not cause deformation of the tool, because the locking occurs in the same axis of the tool. For example, when assembling the inserts in the cutting tool, a user may tend to over-torque or under-torque the insert, which could cause the cutting tool to become deformed. In accordance with the cutting tool of the present invention, even if the screw is over-torqued or under-torqued, the shape of the milling cutter is essentially unaffected.

With reference to FIGS. 8-13, a cutting insert 12 according to an exemplary embodiment will be described in more detail below. The cutting inserts 12 shown therein include a top cutting plane 60 and a bottom support surface 62. As described above, the bottom support surface 62 engages the top engagement surface 38 of the clamping wedge 18, and is correspondingly shaped for mating thereagainst. While the bottom support surface 62 is shown as being planar, it should be understood that bottom support surface 62 may have other configurations or contours, and may be recessed.

With reference to FIG. 5, the top cutting plane 60 includes an engagement portion 64 for mating with a respective engagement portion 66 located in an insert pocket 14 of the tool body holder 16. In particular, the engagement portions 64 and 66 should be designed so that a shear resistance created between the engagement portion 64 of the cutting insert 12 and the engagement portion 66 of the insert pocket 14 during operation of the tool is greater than a shear force created during operation of the cutting tool. This relationship is shown, for example, in FIG. 16 in accordance with an alternative embodiment of the present invention, wherein F1 is the centrifugal force and F2 is the shear resistance. The engagement portions are designed so that F2 is greater than F1, when the cutting tool is rotated in the direction of arrow A.

In accordance with the exemplary embodiment of the present invention, the engagement portion 64 is shown as a plurality of substantially parallel serrations 67, as shown with reference back to FIGS. 8-13. In particular, the serrations 67 may be equally spaced or unequally spaced. Unequally spaced serrations 67 provide error proof positioning of a cutting insert, so that cutting inserts made for specific applications can not be used in other applications for which they were not intended. As shown in the exemplary embodiment, there are five serrations disposed thereon. The serrations 67 are in contact with mating serrations 68 of the insert pocket 14, as shown with reference to FIGS. 3 and 5. The plurality of serrations 67 are preferably normal to the centrifugal force F1, and further provide redundancy between the mating surfaces of the cutting insert 12 and the mating portions disposed within the insert pocket 14. It should be noted that the serrations 67 are preferably parallel, or within a 10 degree variation, for ease of manufacturing. Moreover, the serrations 67 further provide uniform positioning of the cutting insert 12.

While the exemplary embodiment describes a plurality of serrations 67 for use as the engagement portion 64, it should be understood that many different types of configurations are possible, so long as the shear resistance is greater than the centrifugal load. In addition, there may be more or less than five serrations, depending on application and design preference, and can be as few as one serration. Moreover, the engagement portion 64 need not be formed parallel to the cutting edge, but can be formed at angles thereto. Similarly, additional serrations extending perpendicular to serrations 67 are also possible, so that the cutting insert can be indexed at four different positions, instead of two.

Each of the cutting inserts 12 shown in FIGS. 8-12 includes at least one cutting edge or corner. With reference in particular to FIG. 8A, the cutting insert 12 shown therein includes a first cutting edge 70 and a second cutting edge 72. When the cutting insert 12 is mounted in the tool holder body, one the cutting edges will be exposed and the other cutting edge is substantially encapsulated within the insert pocket 14. For example, as shown with reference to FIG. 3, the first cutting edge 70 is exposed for active cutting, while the second cutting edge 72 is removed from the cutting zone 24. As such, the second cutting edge 72 is protected from wear by ongoing chips.

Figure 8A:
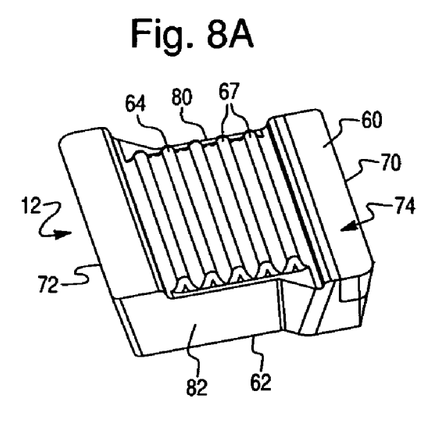
FIG. 8A is a perspective view of an exemplary embodiment of a cutting insert of the cutting tool of the present invention.
Figure 8B:
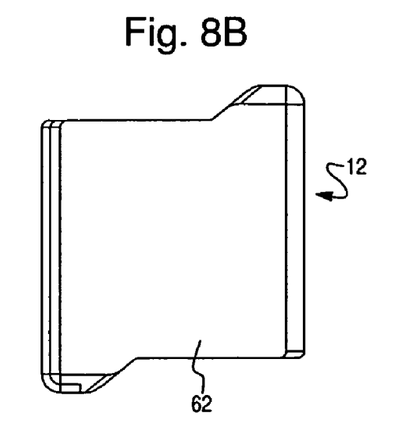
FIG. 8B is a bottom plan view of an exemplary embodiment of a cutting insert of the cutting tool of the present invention.

As shown in FIG. 8A, the cutting insert 12 includes a cutting tip 74 disposed along the entire cutting edge 70. Preferably, the cutting tip 74 is made from cubical boron nitride or polycrystalline diamond, but may be made from other hard materials. When the cutting insert 12 of FIG. 8 is inserted into the pocket 14, the thrust surface 28 engages the distal end 26 of the adjustment screw 22, as shown in FIG. 4. When the cutting edge 70 is exposed for cutting, the thrust surface 28 will be on a rear side surface 80 of the cutting insert 12, as shown in FIG. 8A. When the cutting edge 72 is exposed for cutting, the thrust surface will be on a front side portion 82 of the cutting insert 12, as shown in FIG. 8A.

Figure 9A:
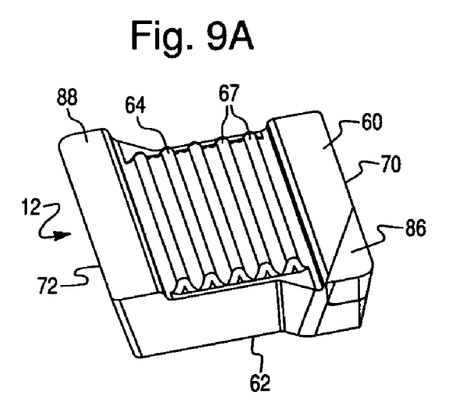
FIG. 9A is a perspective view of an alternative embodiment of a cutting insert of the cutting tool of the present invention.
Figure 9B:
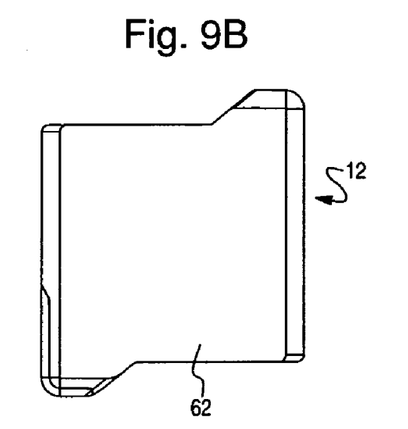
FIG. 9B is a bottom plan view of an alternative embodiment of a cutting insert of the cutting tool of the present invention.

Similarly, as shown with reference to FIG. 9A, the cutting insert 12 shown therein includes a first cutting edge 70 and a second cutting edge 72. When the cutting insert 12 is mounted in the tool holder body, one the cutting edges will be exposed and the other cutting edge is substantially encapsulated within the insert pocket 14 (see FIGS. 3 and 5). As shown in FIG. 9A, the cutting insert 12 includes a cutting tip 86 disposed at a corner of the cutting insert 12. Preferably, the cutting tip 86 is made from cubical boron nitride or polycrystalline diamond, but may be made from other hard materials.

Although not shown, an additional cutting tip may be positioned at an opposite corner 88 of the cutting insert 12, so that the second cutting edge 72 of the cutting insert 12 can be used when the first cutting edge 70 is worn.

Figure 10A:
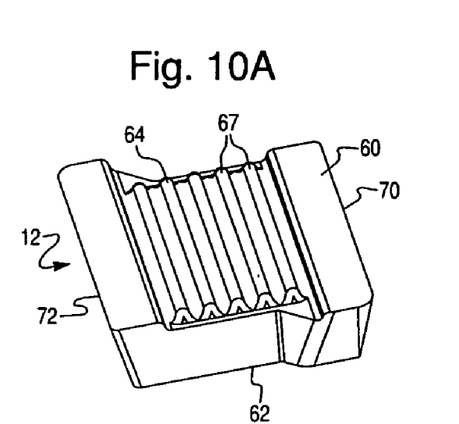
FIG. 10A is a perspective view of an alternative embodiment of a cutting insert of the cutting tool of the present invention.
Figure 10B:
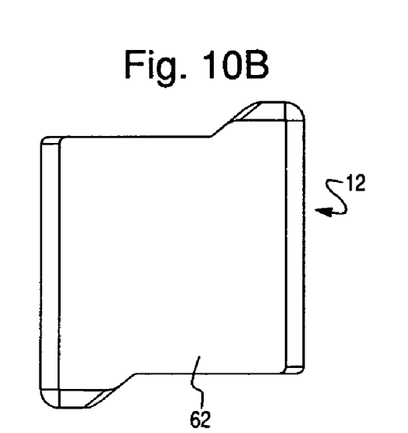
FIG. 10B is a bottom plan view of an alternative embodiment of a cutting insert of the cutting tool of the present invention.

Similarly, as shown with reference to FIG. 10A, the cutting insert 12 shown therein includes a first cutting edge 70 and a second cutting edge 72. The cutting insert 12 shown in FIG. 10A is substantially similar to the cutting insert shown in FIG. 8A, except that a cutting tip is not provided on either of the first or second cutting edges 70 and 72.

Figure 11A:
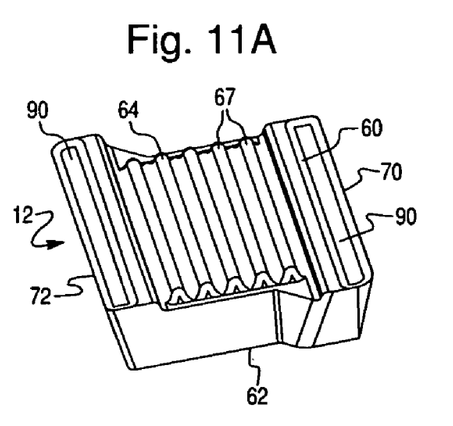
FIG. 11A is a perspective view of an alternative embodiment of a cutting insert of the cutting tool of the present invention.
Figure 11B:
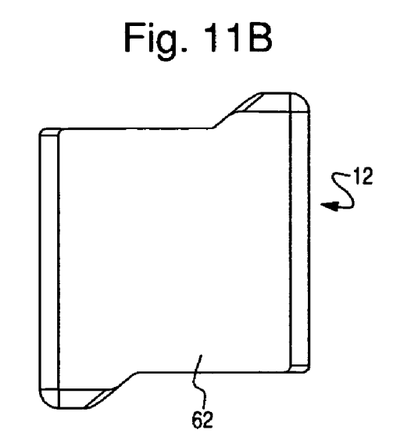
FIG. 11B is a bottom plan view of an alternative embodiment of a cutting insert of the cutting tool of the present invention.

With reference to FIG. 11A, the cutting insert 12 shown therein includes a first cutting edge 70 and a second cutting edge 72. The cutting insert 12 shown in FIG. 11A is substantially similar to the cutting insert shown in FIG. 10A, except that a pair of chip breakers 90 are provided. The ribs 90 provide further redundancy and shear resistance to the centrifugal load.

Figure 12A:
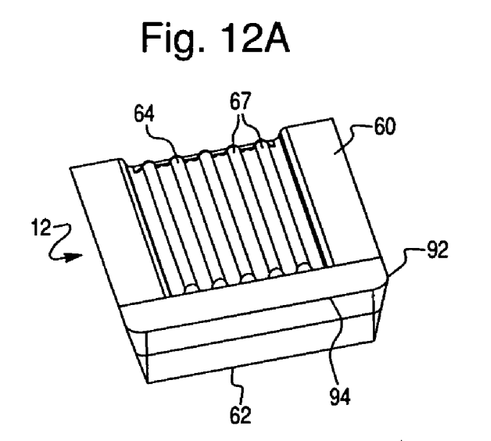
FIG. 12A is a perspective view of an alternative embodiment of a wiper-style cutting insert of the cutting tool of the present invention.
Figure 12B:
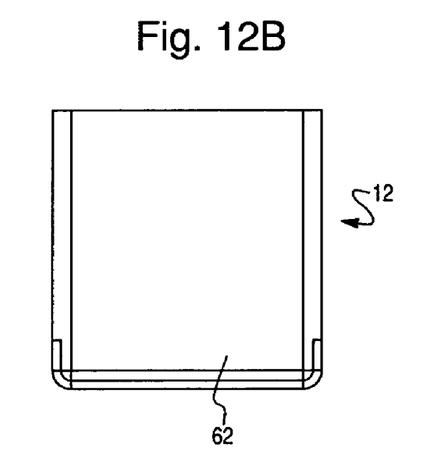
FIG. 12B is a bottom plan view of an alternative embodiment of a wiper-style cutting insert of the cutting tool of the present invention.

With reference to FIG. 12A, the cutting insert 12 shown therein includes a first cutting edge 92 and a second cutting edge 94 perpendicular to the first cutting edge 92. When the cutting insert 12 in accordance with FIG. 12A is positioned within a tool holder body, both cutting edges 92 and 94 can be exposed for cutting. In addition, both cutting edges 92 and 94 can be provided with a cutting tip made from a different material from the cutting insert 12, such as described above. Moreover, it should be understood that other areas of the cutting insert 12 in accordance with FIG. 12A may be provided with cutting tips made from stronger material.

While FIGS. 8-12 describe various embodiments including five serrations, it should be understood that other configurations are possible. In particular, there can be other types of engagement portions provided, so long a the shear resistance is greater than the centrifugal load. Moreover, the invention is applicable on any insert shape, such as triangular, rhombic, square, rectangular, round, hexagonal and octagonal inserts, and inserts for grooving operations.

In operation, the cutting insert 12 is positioned into the insert pocket 14 until the thrust surface 28 abuts the adjustment screw 22, as shown, for example, in FIG. 4. At this point, the clamping wedge 18 is preferably loosened to the extent to allow the cutting insert 12 to be easily positioned therein. Preferably, the clamping wedge 18 stays secured within the insert pocket of the cutting tool during assembly of the cutting insert 12. As described above, the clamping wedge 18 is driven by rotation of the clamping screw 20, which drives the clamping wedge 18 against the cutting insert 12, and firmly locks the cutting insert 12 in a direction normal to a plane of the serrations 67. At the same time, a friction force developed between the clamping wedge 18 and the cutting insert 12 causes the cutting insert 12 to move in a direction parallel to the serration plane to guarantee contact of the thrust surface 28 with the adjustment screw 22, as shown in FIG. 4. In addition, the clamping provides a compressive force or preload, which supplement the shear forces provided by the serrations 67.

As described above, and in accordance with the exemplary embodiment, 1½ turns of the L-wrench is sufficient to both mount and release the cutting insert 12 for easy assembly. Preferably, the clamping wedge 18 remains within the insert pocket 14 during exchange or replacement of a cutting insert. This reduces risk of loss, because the clamping wedge 18 need not be removed from the tool. Once the cutting insert 12 is mounted within the insert pocket 14, it may be axially adjusted by way of adjustment screw 22. As described above, an L-wrench can be used to engage of a recess 34 disposed on the head 36 of the adjustment screw 22 to provide for precision adjustment once the cutting insert 12 is mounted therein.

When the cutting tool is fully assembled, a significant portion of the cutting insert 12 is enclosed or encapsulated in the insert pocket 14. According to an exemplary embodiment, at least 75% of the cutting insert 12 is encapsulated into the insert pocket 14 formed by the tool holder body 16 and the clamping wedge 18 and is rigidly mounted therein, as shown, for example, in FIG. 3. Because the cutting insert 12 is encapsulated and there are redundant securing features, should a small portion of the insert break off, a majority of the insert is still retained in the closed pocket. Thus, the kinetic energy released by such a failure is minimized, in contrast to the situation where the entire insert would be released, as in the prior art.

The cutting tool of the present invention is particularly useful in high speed applications, because the tool is capable of absorbing high centrifugal forces. For example, the cutting tool in accordance with an exemplary embodiment of the present invention is capable of performing in speeds ranging up to 20,000 SFM, which is an optimal cutting speed for applications using cubical boron nitride or polycrystalline diamond. However, as discussed above, the cutting tool of the present invention can also be used in low speed applications.

Figure 13A:
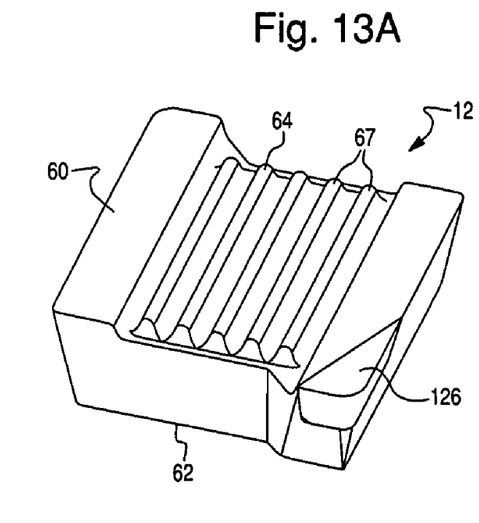
FIG. 13A is a perspective view of an exemplary embodiment of a cutting insert including five serrations.
Figure 13B:
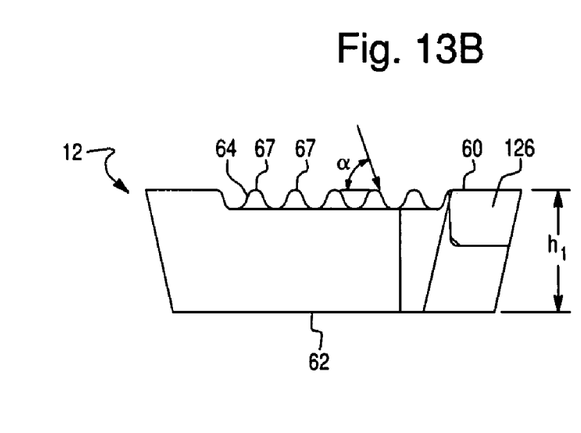
FIG. 13B is a side elevational view of an exemplary embodiment of a cutting insert including five serrations.
Figure 14A:
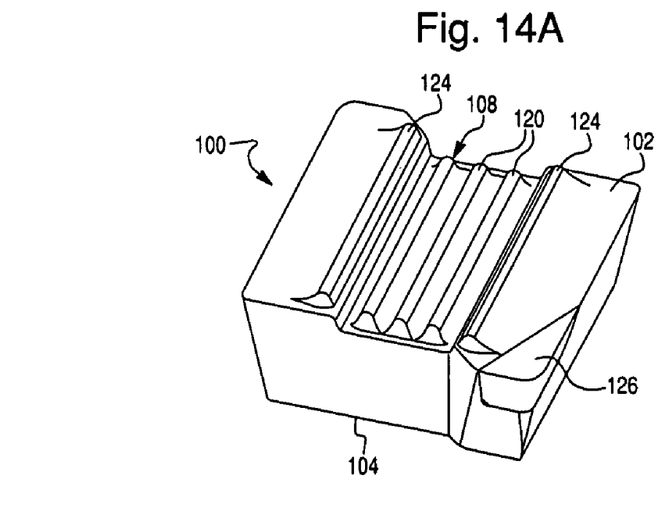
FIG. 14A is a perspective view of an alternative embodiment of a cutting insert including protective ribs.
Figure 14B:
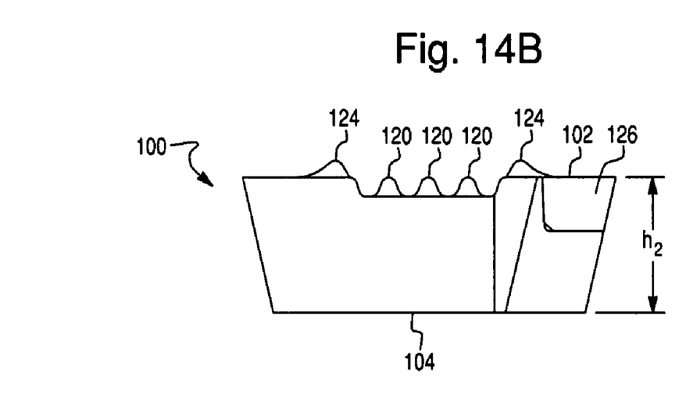
FIG. 14B is a side elevational view of an alternative embodiment of a cutting insert including protective ribs.

With reference to FIGS. 13-14, the cutting insert 12 of the exemplary embodiment of the present invention will be compared to a cutting insert 100 according to an alternative embodiment, where FIGS. 13A and 13B illustrate cutting insert 12 discussed above and FIGS. 14A and 14B illustrate a cutting insert 100 according to an alternative embodiment. As discussed above, the cutting insert 12 includes a top cutting plane 60 including five serrations 67 disposed thereon. Like the cutting insert 12, cutting insert 100 includes a top cutting plane 102 and a bottom support surface 104, where the bottom support surface 104 engages the top engagement surface 38 of the clamping wedge 18, and is correspondingly shaped for mating thereagainst. While the bottom support surface 104 is shown as being planar, it should be understood that bottom support surface 104 may have other configurations or contours, and may be recessed. For example, while convex and/or concave surfaces are possible, these types of surfaces are not preferable.

Figure 16:
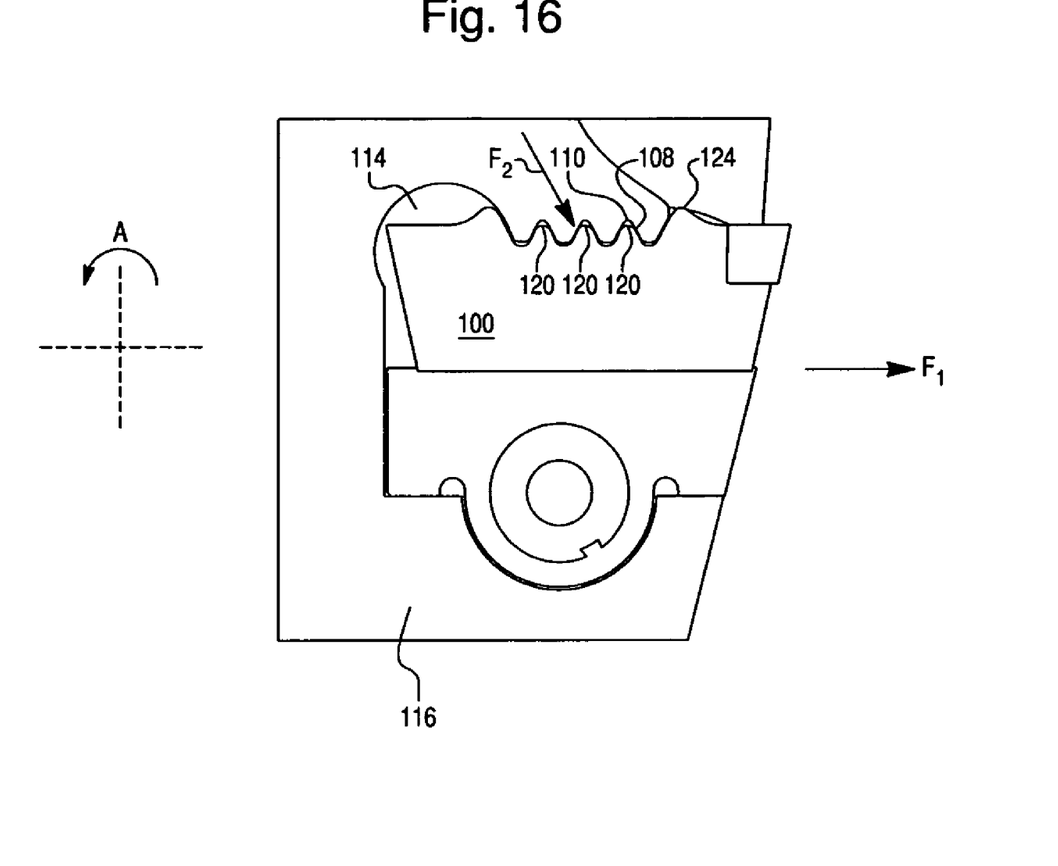
FIG. 16 is a partial, cross-sectional view of the clamping wedge and cutting insert in accordance with an alternative embodiment shown in FIGS. 14A and 14B.
Figure 17:
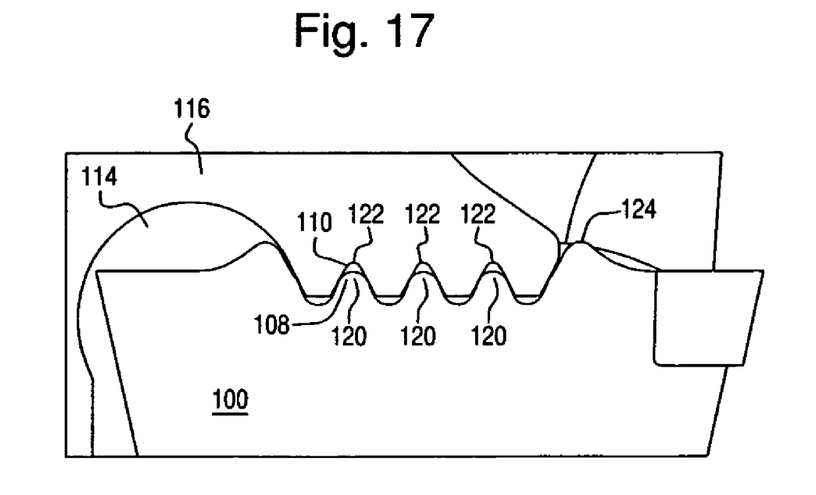
FIG. 17 is a partial, cross-sectional view of the cutting insert and mating surface of the insert pocket in accordance with the alternative embodiment shown in FIGS. 14A and 14B.

Like the cutting insert 12, the top cutting plane 102 of the cutting insert 100 includes an engagement portion 108 for mating with a respective engagement portion 110, located in an insert pocket 114 of the tool body holder 116, as shown with reference to FIGS. 16 and 17. In particular, the engagement portions 108 and 110 should be designed so that a shear resistance created between the engagement portion 108 of the cutting insert 100 and the engagement portion 110 of the insert pocket 114 during operation of the tool is greater than a shear force created during operation of the cutting tool. This relationship is shown in FIG. 16, wherein F1 is the centrifugal force and F2 is the shear resistance. The engagement portions 108 and 100 are designed so that F2 is greater than F1, when the cutting tool is rotated in the direction of arrow A.

In accordance with the alternative embodiment of the present invention, the engagement portion 108 is shown as a plurality of substantially parallel serrations 120, as shown with reference back to FIGS. 14A and 14B. As shown in the alternative embodiment, there are three serrations 120 disposed thereon. The serrations 120 are in contact with mating serrations 122 of the insert pocket 114, as shown with reference to FIG. 17. The plurality of serrations 120 are preferably normal to the centrifugal force F1, and further provide redundancy between the mating surfaces of the cutting insert 100 and the mating portions disposed within the insert pocket 114. Moreover, the serrations 120 further provide uniform positioning of the cutting insert 100.

While the alternative embodiment describes a plurality of serrations 120 for use as the engagement portion 108, it should be understood that many different types of configurations are possible, so long as the shear resistance is greater than the centrifugal load. In addition, there may be more or less than three serrations, depending on application and design preference, and can be as few as one serration. Similarly, additional serrations extending perpendicular to serrations 120 are also possible, so that the cutting insert can be indexed at four different positions, instead of two.

With reference to FIGS. 14A, 14B, 16, and 17, the cutting insert 100 also includes a pair of protective ribs 124 disposed on the top cutting plane 102. The protective ribs 124 preferably flank the serration(s) 120 and run substantially parallel thereto. The protective ribs 124 prevent the tool body 116 from chip erosion. In particular, chips will be deflected by the protective rib to protect the tool body 116 from erosion. Preferably, the protective ribs 124 are made from any hard materials, such as conventional cemented carbide, ceramics, cermets, or the like, and may also include portions made from cubical boron nitride and polycrystalline diamond. For example, cutting insert 100 shown in FIG. 14 includes a cutting tip 126 made from cubical boron nitride and polycrystalline diamond. However, it should be understood that a cutting tip may be included at other locations, as described above, or not provided at all.

With reference to FIGS. 13B and 14B, the cutting insert 12 and cutting insert 100 are further compared. In particular, the cutting insert 100 is designed so that a $h_2$ of the insert 100 is greater than $h_1$ of the insert 12. Preferably, the height $h_1$ of the cutting insert 12 is approximately 3.5 mm, while the height $h_2$ of the cutting insert 100 is approximately 4.0 mm. The increased height of the cutting insert 100 increases strength, but also increases insert weight and reduces cutter density. For example, 14 inserts can be used in the exemplary embodiment of the cutting tool using cutting inserts 12, while 12 inserts can be used in the alternative embodiment of the cutting tool using cutting inserts 100. However, as previously discussed, there may be more or less cutting inserts provided in the cutting tool, depending on application and preference. Moreover, it should be understood that the height of the cutting insert 12 and cutting insert 100 can vary depending on application and design preference, and is not limited to the particular values recited above.

Figure 15A:
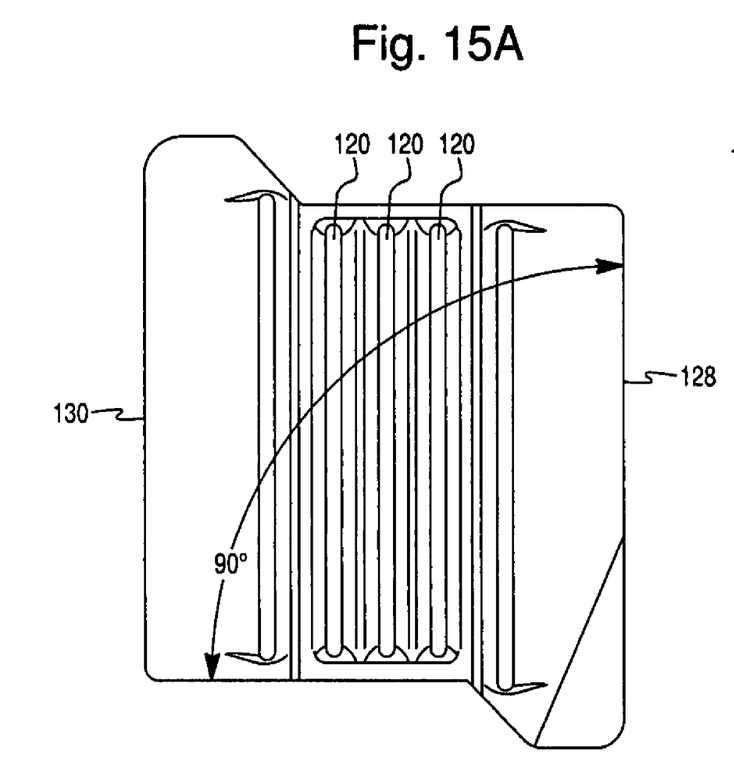
FIG. 15A is a top plan view of an alternative embodiment of the cutting insert including protective ribs.
Figure 15B:
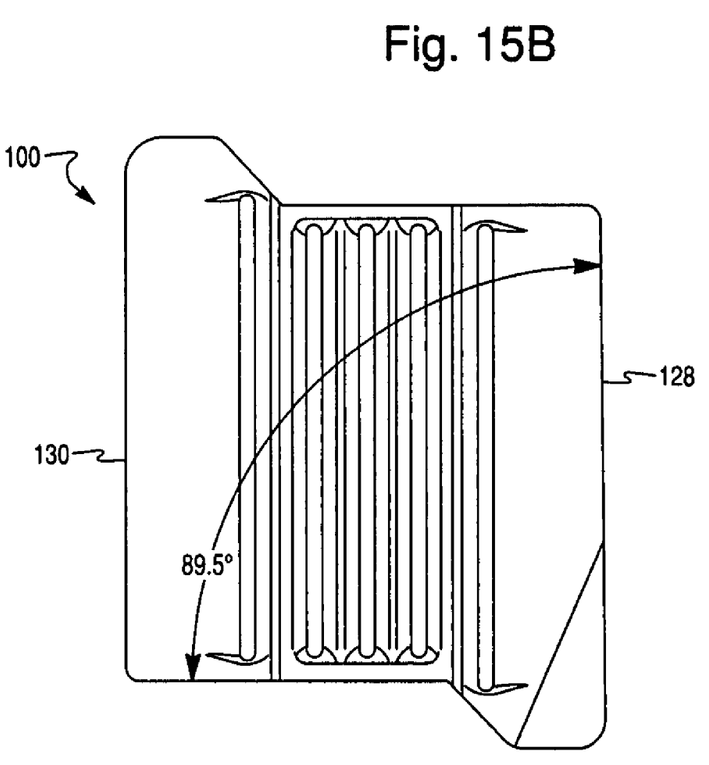
FIG. 15B is a top plan view of an alternative embodiment of the cutting insert including protective ribs.

With reference to FIGS. 15A and 15B, the cutting insert 100 includes a first cutting edge 128 and a second cutting edge 130. As shown in FIG. 15A, the first cutting edge 128 is substantially parallel to the serrations 120. With reference to FIG. 15B, the first cutting edge 128 is disposed at a slight angle to the serrations 120. In particular, the first cutting edge 128 is disposed at an angle of 0.5 degrees, with a standard deviation of 0.3 degrees. However, it should be understood that a range of angles is possible, and not limited to those shown in FIGS. 15A and 15B.

Figure 18:
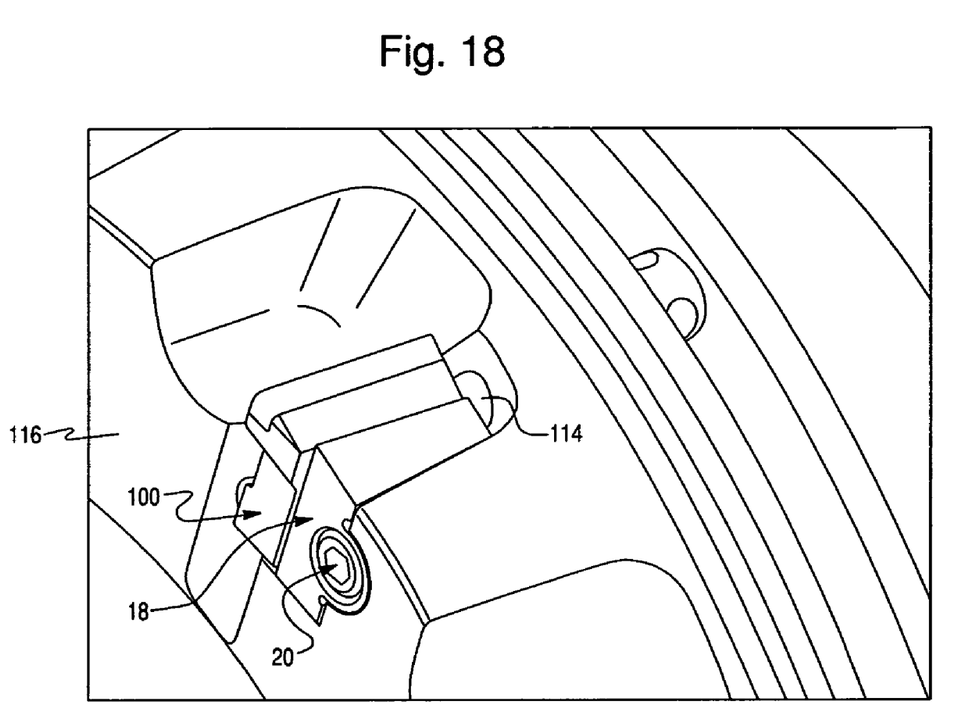
FIG. 18 is a partial, perspective view of an alternative embodiment of the cutting tool of the present invention.
Figure 19:
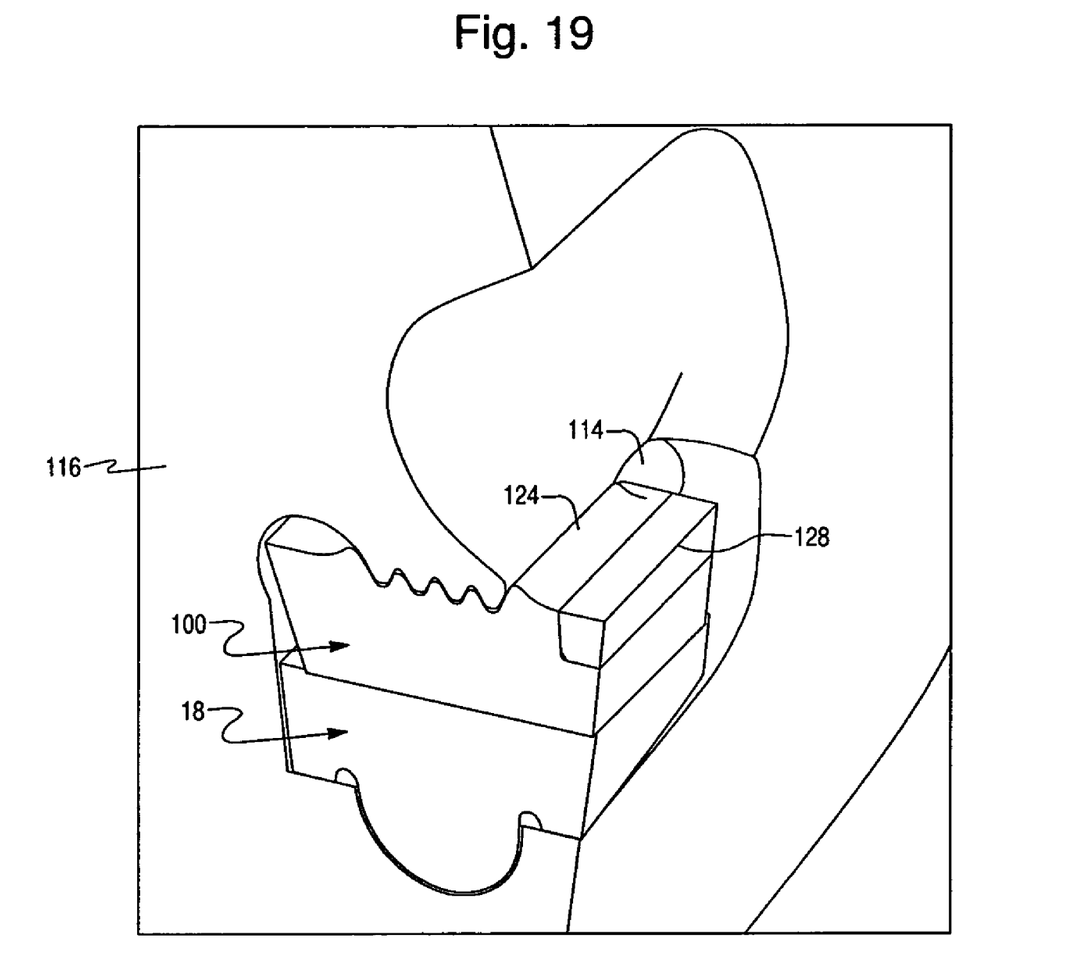
FIG. 19 is a partial, perspective view of an alternative embodiment of the cutting tool of the present invention.

With reference to FIGS. 18 and 19, the cutting insert 100 is mounted in the tool body 116. The cutting insert 100 is mounted in the tool body 116 by way a clamping wedge 18 in a similar way to that described above in connection with the exemplary embodiment of the cutting insert 12. In particular, the cutting insert 100 is positioned within the insert pocket 114, and the clamping wedge 18 is driven and locked against the cutting insert 100 by way of a clamping screw 20. However, the tool body 116 is of a different shape, so that it corresponds to the top cutting plane 102 of the cutting insert 100. In particular, the tool body 116 is shaped so that one of the protective ribs 124 adjacent the cutting edge 128 is not encapsulated in the insert pocket 114, as shown in particular with reference to FIG. 19. In this way, it can be seen how the protective rib 124 deflects chips during cutting.

As described above, the cutting tool of the present invention provides a unique and reliable clamping system avoiding many of the drawbacks of the prior art. For example, because a substantial portion of the insert is located within the insert pocket of the tool body holder, the inactive cutting edge is protected from wear. In addition, the particular fastening mechanisms are remote from the cutting zone, thereby protecting them from premature wear. Instead, the cutting insert is subjected to the greatest load, which is indexed and then easily replaced, causing less damage to the non-replaceable components of the cutting tool. Most importantly, the engagement portions between the insert and the tool body holder provide for a shear area resistance that is greater than the centrifugal load, which resistance force is further supplemented by a preload from the clamping device. The engagement portions provide for a redundancy which allows the insert to be retained should one of the engagement portions or serrations fail. As such, the cutting tool according to the present invention is more reliable and less susceptible to wear and failure.

The presently disclosed embodiments are considered in all respects to be illustrative and not restrictive. The scope is indicated by the appended claims, rather than the foregoing description, and all changes that come within the meaning and range of equivalents thereof are intended to be embraced.

The invention claimed is:

1. A cutting tool, comprising:
   a tool body including at least one insert pocket;
   at least one cutting insert for being retained in the at least one insert pocket, the at least one cutting insert including a top cutting plane with at least one cutting edge and a bottom support plane, the top cutting plane including an engagement portion for mating with a respective engagement portion located in the at least one insert pocket;
   a clamping wedge for clamping the at least one cutting insert against the at least one insert pocket;
   wherein a shear resistance created between the engagement portions of the at least one cutting insert and the at least one insert pocket during operation of the tool is greater than a centrifugal force created during operation of the cutting tool; and
   wherein the engagement portion of the top cutting plane includes plurality of parallel serrations for mating with respective plurality of parallel serrations included on the engagement portion of the at least one insert pocket.

2. The cutting tool of claim 1, wherein there are five serrations on the top cutting plane of the at least one cutting insert and five serrations on the engagement portion of the at least one insert pocket.

3. The cutting tool of claim 2, wherein the serrations are parallel to the least one cutting edge.

4. The cutting tool of claim 1, further including first and second protective ribs disposed on the top cutting plane and extending substantially parallel to the plurality of serrations of the at least one cutting insert, the protective ribs extending above the top cutting plane.

5. The cutting tool of claim 4, wherein there are three serrations on the top cutting plane which are disposed between the first and second protective ribs.

6. The cutting tool of claim 1, wherein approximately 75% of the at least one cutting insert is encapsulated within the at least one insert pocket.

7. The cutting tool of claim 1, further including a clamping screw for driving the clamping wedge within the at least one insert pocket and locking the clamping wedge against the at least one cutting insert.

8. The cutting tool of claim 7, wherein the clamping screw is a differential screw.

9. The cutting tool of claim 8, wherein the at least one cutting insert is released by 1½ turns of the differential screw.

10. The cutting tool of claim 1, further including an adjustment screw for adjusting the at least one cutting insert.

11. The cutting tool of claim 10, wherein the adjustment screw is located at a position remote from a cutting zone.

12. The cutting tool of claim 10, wherein the adjustment screw includes a ball surface which is in contact with a thrust surface of the at least one cutting insert, said ball surface and threaded area of the adjustment screw including elastic contact deformations.

13. The cutting tool of claim 1, wherein the cutting tool is a high speed milling cutter.

14. A cutting insert, comprising:
   a top cutting plane with at least one cutting edge and a bottom support plane, the top cutting plane including an engagement portion for mating with a respective engagement portion of a cutting tool, wherein the engagement portion provides a shear resistance greater than a centrifugal force created during operation of the cutting tool;
   wherein the engagement portion of the top cutting plane includes plurality of parallel serrations for mating with respective plurality of parallel serrations included on the engagement portion of the cutting tool, said cutting edge and peaks of said plurality of serrations being located on a common plane.

15. The cutting tool of claim 14, wherein there are five serrations on the top cutting plane of the at least one cutting insert and five serrations on the engagement portion of the at least one insert pocket.

16. The cutting tool of claim 15, wherein the serrations are parallel to the at least one cutting edge.

17. The cutting tool of claim 14, further including first and second protective ribs disposed on the top cutting plane and extending substantially parallel to the plurality of serrations of the at least one cutting insert, the protective ribs extending above the top cutting plane.

18. The cutting tool of claim 17, wherein there are three serrations on the top cutting plane which are disposed between the first and second protective ribs.

* * * * *